United States Patent
Flowers

(10) Patent No.: US 7,247,254 B1
(45) Date of Patent: Jul. 24, 2007

(54) ANTIFREEZE COMPOSITION AND METHOD

(75) Inventor: Robert C. Flowers, Archdale, NC (US)

(73) Assignee: Camco Manufacturing, Inc., Greensboro, NC (US)

( * ) Notice: Subject to any disclaimer, the term of this patent is extended or adjusted under 35 U.S.C. 154(b) by 97 days.

(21) Appl. No.: 11/147,947

(22) Filed: Jun. 8, 2005

(51) Int. Cl.
*C09K 5/20* (2006.01)
*C09K 5/10* (2006.01)

(52) U.S. Cl. .......................... 252/70; 252/71; 252/73; 62/80; 62/81

(58) Field of Classification Search .................. 252/70, 252/71, 73; 62/80, 81
See application file for complete search history.

(56) References Cited

U.S. PATENT DOCUMENTS

| | | | | |
|---|---|---|---|---|
| 1,900,014 | A * | 3/1933 | Graves | 252/73 |
| 3,147,223 | A * | 9/1964 | Boies et al. | 252/75 |
| 4,374,057 | A * | 2/1983 | Goodman et al. | 502/160 |
| 5,905,072 | A * | 5/1999 | Capuzzi et al. | 514/63 |
| 7,029,524 | B2 * | 4/2006 | Newbacher et al. | 106/31.58 |

FOREIGN PATENT DOCUMENTS

| JP | 62-218472 A | * | 9/1987 |
|---|---|---|---|
| JP | 6-264087 A | * | 9/1994 |

OTHER PUBLICATIONS

One page print out of a webpage from sci-toys.com titled: "Ingredients—Polysorbate 80"; undated.
One page titled: "Chemical and physical properties: Emulsifiers"; undated.
One page titled: "Product Information Bulletin" of Uniqema on "Tween 80"; dated Apr. 1999.
Two pages; titled: "Tween series Polyoxyethylene derivatives of sorbitan esters" of Uniqema; dated 2004.
One page titled: "Certificate of Analysis" of Uniqema on the product "Tween 80"; dated Jul. 14, 2004.
Eight pages titled: "Material Safety Data Sheet" on the product Tween 80 of Uniqema; revision date of Jan. 17, 2001.

* cited by examiner

*Primary Examiner*—Anthony J. Green

(57) ABSTRACT

An antifreeze composition and method of use provides safety and protection for potable water systems in RVs, vacation homes, swimming pools and raw water cooled marine engines against freeze damage. The antifreeze composition includes propylene glycol, a sorbitol surfactant having a high Hydrophilic Lipophilic Balance (HLB) number and water. The preferred sorbitol surfactant consists of food grade polyoxyethylene (20) sorbitan monooleate. By directing the antifreeze composition into these water systems, freeze damage is prevented even when the temperature drops to extremely low levels.

12 Claims, No Drawings

ANTIFREEZE COMPOSITION AND METHOD

FIELD OF THE INVENTION

The invention herein pertains to antifreeze compositions and particularly pertains to safe, reliable antifreeze compositions for use in potable water systems, swimming pools and raw water cooled marine engines.

DESCRIPTION OF THE PRIOR ART AND OBJECTIVES OF THE INVENTION

The demand for antifreeze to be used in potable water systems in recreational vehicles (RVs), vacation homes and swimming pools and raw water cooled marine engine winterization has greatly increased in recent years. Owners in northern states and other colder climates must insure that potable water systems which connect bathrooms, kitchens, water faucets, water heaters and other equipment are protected from freezing temperatures during cold, winter months. These water systems are usually drained in preparation of cold weather and require the addition of a safe, non-toxic conventional antifreeze with a propylene glycol base since residual amounts of the antifreeze will remain in the water system and may possibly be ingested by the occupants. While propylene glycol provides a nontoxic antifreeze base, it does not always sufficiently depress the freezing point of the system it is being used to protect. Thus, owners have returned in the spring after an extremely cold winter only to find pipes and/or systems that have burst and leaking water which causes undue inconvenience and expense.

In view of the problems and disadvantages of conventional potable water antifreezes and methods, the present invention was conceived and one of its objectives is to provide a propylene glycol antifreeze composition having a chemical additive which will improve the antifreeze composition by depressing the freezing point.

It is another objective of the present invention to provide a propylene glycol antifreeze composition having a freezing point depressing chemical additive considered "Generally Regarded As Safe" (GRAS) for human consumption.

It is still another objective of the present invention to provide a propylene glycol antifreeze composition which is cost effective and convenient to use.

It is yet another objective of the present invention to provide a method for using the antifreeze composition for maintaining potable water systems, swimming pools and raw water cooled marine engines to prevent damage to equipment from freezing temperatures.

It is also another objective of the present invention to provide a propylene glycol antifreeze composition containing a sorbitol surfactant having a high Hydrophilic Lipophilic Balance (HLB) number.

Various other objectives and advantages of the present invention will become apparent to those skilled in the art as a more detailed description is set forth below.

SUMMARY OF THE INVENTION

The aforesaid and other objectives are realized by providing an antifreeze composition for use in for example, both potable and non-potable water systems to protect the lines, pipes, equipment, etc. from the effects of freezing in very cold temperatures. Such antifreezes include propylene glycol (monopropylene glycol; 99.4% by weight as sold by Shell Chemical Company of Cincinnati, Ohio). It has been found that certain sorbitol surfactants of food grade quality, "Generally Regarded As Safe" (GRAS) for human consumption having a high Hydrophilic Lipophilic Balance (HLB) number lowers the freezing point of the antifreeze composition. High HLB numbers are considered to be in the range of from about 11-17.

The preferred sorbitol surfactant consists of polyoxyethylene (20) sorbitan monooleate [POE (20) sorbitan monooleate] as sold under the trademark: "Tween 80" by ICI America's, Inc., a subsidiary of Imperials Chemical Industries PLC. Imperials Chemical Industries PLC operates under the trade name: UNIQEMA whose U.S. address is Uniqema Corporate Center, 1000 Uniqema Boulevard, New Castle, Del. 19720-2790.

In the marketplace, antifreeze is sold by various companies, generally in two (2) concentrations: a minus 50 degrees F. (−50) freeze protection composition and a minus 100 degrees F. (−100) freeze protection composition. Other concentrations are available for specific applications as well as dilution charts for milder climates. In use, the user first drains the water system. After draining, various methods and devices are used to fill the system with the selected antifreeze concentration. Instructions on the antifreeze composition container are provided to make sure the antifreeze composition completely fills the water system. For example, with the water system so filled, the water system is safe to −50 degrees F. or −100 degrees F. temperatures (as selected) without fear of damaged plumbing or equipment.

In a conventional −50 antifreeze composition, propylene glycol comprises approximately 30-32% by weight of the composition whereas in a −100 type, propylene glycol is increased to approximately 60-62% by weight. The balance is water approximately 68-70% or 38-40% by weight respectively, and sometimes corrosion inhibitors and trace dyes.

When water freezes, ice crystals form within the contained space (for example, a pipe) and grow as the temperature remains below a specific freezing temperature. The ice crystals can quickly exceed the size of the contained space, causing the container to rupture. Later, as the ice crystals thaw, water leaks from the ruptured space. This is usually detected by the user when the water system is placed back in service by leaks and water damage to surrounding areas and/or equipment.

Antifreeze lowers freezing temperature due to the colligative properties of a solution. Colligative properties are properties of solutions that depend on the amount of solute particles in the solution (concentration) and are independent of the nature of the solute. Freezing point depression is one of the colligative properties. For example, with water as the solvent, the freezing point will decrease proportionately for each gram of propylene glycol added to the water.

It has been found that the addition of selected surfactants lowers the surface tension and the concentration of the surfactant at normal freezing temperatures which causes the solution to gel. With the use of POE (20) sorbitan monooleate, the antifreeze composition does form a gel instead of ice crystals and therefore enhances the freeze protection.

By adding a sorbitol surfactant of food grade quality GRAS with a high HLB number to the propylene glycol based antifreeze composition, the freeze point can be depressed to further enhance the effectiveness of the antifreeze.

DETAILED DESCRIPTION OF THE PREFERRED EMBODIMENTS AND OPERATION OF THE INVENTION

It has been discovered that a safe, more effective antifreeze composition can be manufactured using 69.8% by weight water, 30% by weight propylene glycol and 0.20% sorbitol surfactant. The preferred surfactant is polyoxyethylene (20) sorbitan monooleate [POE (20) sorbitan monooleate] GRAS (Generally Regarded As Safe) for human consumption. Sorbitol surfactants are manufactured by various companies and it has been found that a surfactant with a high Hydrophilic Lipophilic Balance (HLB) number (approximately 11-17) will lower the freeze protection point of the propylene glycol (PG) based antifreeze composition about 10 degrees F. over the same antifreeze composition without the sorbitol surfactant. In addition to the preferred POE (20) sorbitan monooleate, other sorbitol surfactants having a high HLB number, such as shown in Table 1, can also be used with varying results.

TABLE 1

| Chemical Description | HLB Number |
| --- | --- |
| POE (20) sorbitan monolaurate | 16.7 |
| POE (4) sorbitan monolaurate | 13.3 |
| POE (20) sorbitan monopalmitate | 15.6 |
| POE (20) sorbitan monostearate | 14.9 |
| POE (20) sorbitan monostearate | 14.9 |
| POE (20) sorbitan tristearate | 10.5 |
| *POE (20) sorbitan monooleate | 15 |
| POE (20) sorbitan monooleate | 15 |
| POE (5) sorbitan monooleate | 10 |
| POE (20) sorbitan trioleate | 11 |

*polyoxyethylene (20) sorbitan monooleate

Commercial antifreeze compositions as sold in the marketplace are generally designated as −50 or −100 with a freeze protection of either −50 degrees F. or −100 degrees F. Other concentrations are available for specific applications as well as dilution charts for milder climates.

The preferred −50 antifreeze composition described herein consists of 69.8% by weight water, 30% by weight propylene glycol and 0.20% by weight POE (20) sorbitan monooleate with the desired colorant and/or inhibitor as required for corrosion protection. However, it should be noted that the propylene glycol working range can consist from 22-32% by weight. In addition, it was noted that the POE (20) sorbitan monooleate has a preferred range of 0.10% to 1% by weight of the antifreeze composition.

TABLE 2

−50 Antifreeze Composition (all percentages by weight)

| | % Propylene Glycol | % POE (20)* | % Water | Bursting Point (-F.) |
| --- | --- | --- | --- | --- |
| Control | 30 | 0.00 | 70 | −52 |
| Sample A | 30 | 0.20 | 69.8 | −62 |
| Sample B | 29 | 0.20 | 70.8 | −60 |
| Sample C | 28 | 0.20 | 71.8 | −55 |
| Sample D | 27 | 0.20 | 72.8 | −51 |
| Sample E | 26 | 0.20 | 73.8 | −47 |
| Sample F | 25 | 0.20 | 74.8 | −45 |
| Sample G | 30 | 0.40 | 69.6 | −62 |
| Sample H | 30 | 0.80 | 69.2 | −63 |

*POE (20) sorbitan monooleate

In Table 2 shown above eight (8) samples (A-H) of −50 degrees F. antifreeze composition were evaluated. As shown, the addition of 0.20% by weight POE (20) sorbitan monooleate in sample A lowered the freezing point to −62 degrees F. The same composition (control sample) without the sorbitol surfactant has a freezing point of −52 degrees F. Thus, by the addition of the POE (20) sorbitan monooleate, the burst protection of the antifreeze is enhanced.

TABLE 3

−100 Antifreeze Composition (all percentages by weight)

| | % Propylene Glycol | % POE (20)* | % Water | Ice Crystals Formed |
| --- | --- | --- | --- | --- |
| Control | 58 | 0.00 | 42.00 | Yes |
| Sample I | 58 | 0.20 | 41.80 | No |
| Sample J | 56 | 0.20 | 43.80 | No |
| Sample K | 54 | 0.40 | 45.60 | No |
| Sample L | 52 | 0.40 | 47.60 | No |
| Sample M | 50 | 0.40 | 49.60 | No |
| Sample N | 48 | 0.40 | 51.60 | Yes |
| Sample O | 46 | 0.40 | 53.60 | Yes |
| Sample P | 44 | 0.40 | 55.60 | Yes/Burst |

*POE (20) sorbitan monooleate

In Table 3 shown above, eight (8) samples (I-P) of −100 degrees F. antifreeze composition were tested at about −99.4 degrees F. using dry ice as the refrigerant. The test method utilized the placement of the antifreeze composition in thin wall glass vials and submerging them in a cooler containing dry ice. The vials were removed from the cooler after approximately four (4) hours and were examined for ice crystals with the results shown in Table 3. It should be noted that the propylene glycol working range can consist from 50-62% by weight with the addition of POE (20) sorbitan monooleate at effective levels of 0.10% to 1% by weight.

As shown, by reducing the propylene glycol in 2% increments, and by adding the sorbitol surfactant POE (20) sorbitan monooleate, ice crystals do not form in the vials at about −100 degrees F. (−99.4 degrees F.). Therefore the burst protection of the antifreeze is enhanced by the addition of the sorbitol surfactant POE (20) sorbitan monooleate In the preferred method of use, a −50 degrees F. antifreeze composition is formed by mixing 0.20-0.40% by weight POE (20) sorbitan monooleate; 28-30% by weight propylene glycol and 71.8-69.6% by weight water. In the alternate preferred method of use, a −100 degrees F. antifreeze composition is formed by mixing 0.20-0.40% by weight POE (20) sorbitan monooleate; 56-58% by weight propylene glycol and 43.8-41.6% by weight water. Other antifreeze compositions formed by mixing 0.10-1% by weight POE (20) sorbitan monooleate; 10-70% by weight propylene glycol and 89.9-29% by weight water are suitable for freeze protection in specific climates. The potable water system of the RV, boat or vacation home to be protected, or winterized, is first drained of any remaining water. In the case of swimming pools and raw water cooled marine engines the water is drained from the circulation lines and equipment. Various methods ranging from pouring the antifreeze composition directly into the drained system to elaborate pumping systems and devices manufactured for the purpose of filling the drained system with the antifreeze composition. The objective is to remove any remaining water from equipment and plumbing that may be damaged by freezing temperatures and replace it with the antifreeze composition to protect it from freezing temperatures.

The illustrations and examples provided herein are for explanatory purposes and are not intended to limit the scope of the appended claims. While the description refers to potable water systems, swimming pool equipment, and raw water cooled marine engines, other uses for the antifreeze composition are apparent.

I claim:

1. The method of preventing freeze damage to a water system comprising the steps of:
   a) mixing a sorbitol surfactant, said sorbitol surfactant having an HLB number between 11-17, with propylene glycol to form an antifreeze composition, said propylene glycol comprising 10-70% by weight of said antifreeze composition, and
   b) directing the antifreeze composition into the water system.

2. The method of claim 1 wherein mixing a sorbitol surfactant comprises the step of mixing a sorbitol surfactant in the amount of 0.10-1% by weight of the antifreeze composition.

3. The method of claim 1 wherein mixing a sorbitol surfactant comprises the step of mixing POE (20) sorbitan monooleate.

4. The method of claim 1 wherein directing the antifreeze composition into the water system comprises the step of pumping the antifreeze composition into RV water lines.

5. The method of preventing freeze damage to a potable water system comprising the steps of:
   a) preparing an antifreeze composition containing propylene glycol, water and a sorbitol surfactant, said sorbitol surfactant having an HLB number between 11-17, and
   b) adding the antifreeze composition to the potable water system.

6. The method of claim 5 wherein preparing an antifreeze composition comprises the step of adding food grade POE (20) sorbitan monooleate to the propylene glycol.

7. The method of claim 5 wherein preparing an antifreeze composition comprises the step of adding 0.10-1% by weight sorbitol surfactant to the antifreeze composition.

8. The method of claim 5 wherein preparing an antifreeze composition comprises the step of preparing an antifreeze composition containing 0.10-1% by weight of POE (20) sorbitan monooleate.

9. The method of claim 8 wherein preparing an antifreeze composition comprises the step of preparing an antifreeze composition containing 0.20% by weight of POE (20) sorbitan monooleate.

10. The method of claim 5 wherein preparing an antifreeze composition comprises the step of preparing an antifreeze composition containing 22-32% by weight of propylene glycol.

11. The method of claim 5 wherein preparing an antifreeze composition comprises the step of preparing an antifreeze composition containing 50-60% by weight of propylene glycol.

12. The method of claim 5 wherein preparing an antifreeze composition comprises the step of adding 15-32% by weight of propylene glycol.

* * * * *